United States Patent
Chezem et al.

(10) Patent No.: US 10,429,863 B2
(45) Date of Patent: Oct. 1, 2019

(54) SYSTEMS AND METHODS FOR REFRIGERATOR CONTROL

(71) Applicant: Haier US Appliance Solutions, Inc., Wilmington, DE (US)

(72) Inventors: Michael Thomas Chezem, Georgetown, IN (US); Martin Mitchell Zentner, Prospect, KY (US); Mark Schipp, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 183 days.

(21) Appl. No.: 15/594,719

(22) Filed: May 15, 2017

(65) Prior Publication Data
US 2018/0329437 A1 Nov. 15, 2018

(51) Int. Cl.
*G05D 23/19* (2006.01)
*F25D 29/00* (2006.01)
*G05D 23/24* (2006.01)

(52) U.S. Cl.
CPC ....... *G05D 23/1932* (2013.01); *F25D 29/005* (2013.01); *F25D 2700/12* (2013.01); *F25D 2700/122* (2013.01); *G05D 23/24* (2013.01)

(58) Field of Classification Search
CPC .. F25D 2700/121; F25D 17/045; F25D 23/04; F25D 23/06; F25D 29/005
See application file for complete search history.

(56) References Cited

U.S. PATENT DOCUMENTS

| 5,231,848 A | 8/1993 | Farr | |
| 5,419,148 A * | 5/1995 | Kuehl | F25D 17/065 |
| | | | 374/208 |
| 5,542,258 A | 8/1996 | Shim | |
| 6,755,243 B2 * | 6/2004 | Cho | A23B 7/10 |
| | | | 165/288 |
| 2005/0235669 A1 * | 10/2005 | Cho | F25D 29/00 |
| | | | 62/229 |
| 2007/0012055 A1 * | 1/2007 | Schenk | F25B 49/025 |
| | | | 62/208 |
| 2018/0279826 A1 * | 10/2018 | Chung | A47J 36/06 |

* cited by examiner

*Primary Examiner* — Christopher R Zerphey
*Assistant Examiner* — Schyler S Sanks
(74) *Attorney, Agent, or Firm* — Dority & Manning, P.A.

(57) ABSTRACT

Systems and methods for controlling refrigerator temperatures are provided. In one example embodiment a control system for adjusting the temperature of a refrigerator, wherein the refrigerator includes a fresh food compartment, a freezer compartment and a cooling system, the control system includes a printed circuit board, one or more thermistors, one or more processors and one or more memory devices, the one or more memory devices storing instructions that when executed by the one or more processors cause the one or more processors to perform operations, the operations can include monitoring one or more characteristics of the one or more thermistors, determining the temperature of the fresh food compartment based, at least in part, on the characteristics of a first thermistor, comparing the determined temperature of the fresh food compartment to a first predetermined threshold value, and determining, by the one or more processors, whether to operate the cooling system.

20 Claims, 5 Drawing Sheets

SYSTEMS AND METHODS FOR REFRIGERATOR CONTROL

FIELD

The subject matter of the present disclosure relates generally to refrigerator appliances. In particular, the present subject matter relates to systems and methods for controlling refrigerators.

BACKGROUND

Refrigerator appliances generally include a cabinet that defines chilled chambers for receipt of food items for storage. Many refrigerator appliances further include one or more freezer chambers for receipt of food items for freezing and storage. While some refrigerators include numerous features (e.g., internet connectivity and complex user interfaces), some consumers (e.g., owners of rental properties, apartments or other multi-family homes) desire appliances that are value oriented, include simplified user interfaces or user controls, and provide energy efficient operation. Some existing methods for providing simplified user interfaces or user controls include the use of electromechanical controls (e.g., cold controls) with a refrigerator. A cold control can be a temperature control incorporating a single pole, single throw switch with an associated set of electrical contacts for turning a refrigerator's compressor and fans on and off.

Among several drawbacks to existing user controls, such as cold controls, are that they are often located within the chilled chambers of the refrigerator which reduces the storage volume of the refrigerator. Another drawback to cold controls is imprecise temperature control. Imprecision in temperature control can decrease energy efficiency. Imprecision in temperature control can make it challenging to define particular information related to the energy efficiency of the refrigerator, such as Energy Star ratings. Another drawback of existing user controls, such as cold controls, is that users can manipulate the controls in a manner that can decrease the level of efficiency achieved during refrigerator operation.

Accordingly, a refrigerator appliance with controls configured to provide reduced user interference and improved accuracy with regard to temperature measurement and control would be useful. Also, a refrigerator appliance with features for mounting temperature controls in a location outside of the chilled chamber or refrigerated compartment, to increase storage volume of the refrigerator, would be useful.

BRIEF DESCRIPTION

Additional aspects and advantages of the invention will be set forth in part in the following description, or may be apparent from the description, or may be learned through practice of the invention.

One example aspect of the present disclosure is directed to a refrigerator appliance. The refrigerator appliance includes a refrigerator cabinet, one or more food compartments, also referred to as chilled chambers or refrigerated compartments, disposed within the cabinet, a cooling system, one or more temperature sensors, wherein at least one temperature sensor comprises a first thermistor, electrically connected to a control system and configured to obtain a temperature of at least one food compartment. The control system can be adapted to monitor and control the temperature in at least one of the food compartments, wherein the control system is configured to store instructions that when executed by one or more controllers cause the one or more controllers to perform operations. The operations performed by the one or more controllers can include determining the temperature of at least one of the food compartments based, at least in part, on one or more characteristics of the first thermistor. The operations performed by the one or more controllers can include determining when to operate the cooling system based, at least in part, on a comparison of the determined temperature to a first threshold value. The comparison can include operating the cooling system when the determined temperature is greater than the first threshold value.

Another example aspect of the present disclosure is directed to a control system for adjusting the temperature of a refrigerator. The refrigerator includes one or more food compartments and a cooling system. The control system includes a printed circuit board, one or more thermistors, one or more processors and one or more memory devices. The one or more memory devices can store data and instructions. The one or more processors can execute the instructions and cause the one or more processors to perform operations that include monitoring one or more characteristics of the one or more thermistors, determining the temperature of at least one food compartment based, at least in part, on the characteristics of a first thermistor and comparing the determined temperature of the food compartment to a first threshold value. The operations can further include determining, by the one or more processors, when to operate the cooling system based, at least in part, on a comparison of the determined temperature to a first threshold value. The comparison includes operating the cooling system when the determined temperature is greater than the first threshold value.

Another example aspect of the present disclosure is directed to a method for controlling the temperature of a refrigerator. The method includes monitoring one or more characteristics of the one or more thermistors. The method further includes determining the temperature of the fresh food compartment based, at least in part, on the characteristics of a first thermistor. The method further includes determining the temperature of the freezer compartment based, at least in part, on the characteristics of a second thermistor. The method further includes determining, by the one or more processors, when to operate the cooling system based, at least in part, on a comparison of the determined temperatures to the first threshold value and the second threshold value. The method further includes operating the cooling system when the determined temperature of the fresh food compartment is greater than the first threshold value. The method further includes operating the cooling system when the determined temperature of the freezer compartment is greater than the second threshold value.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
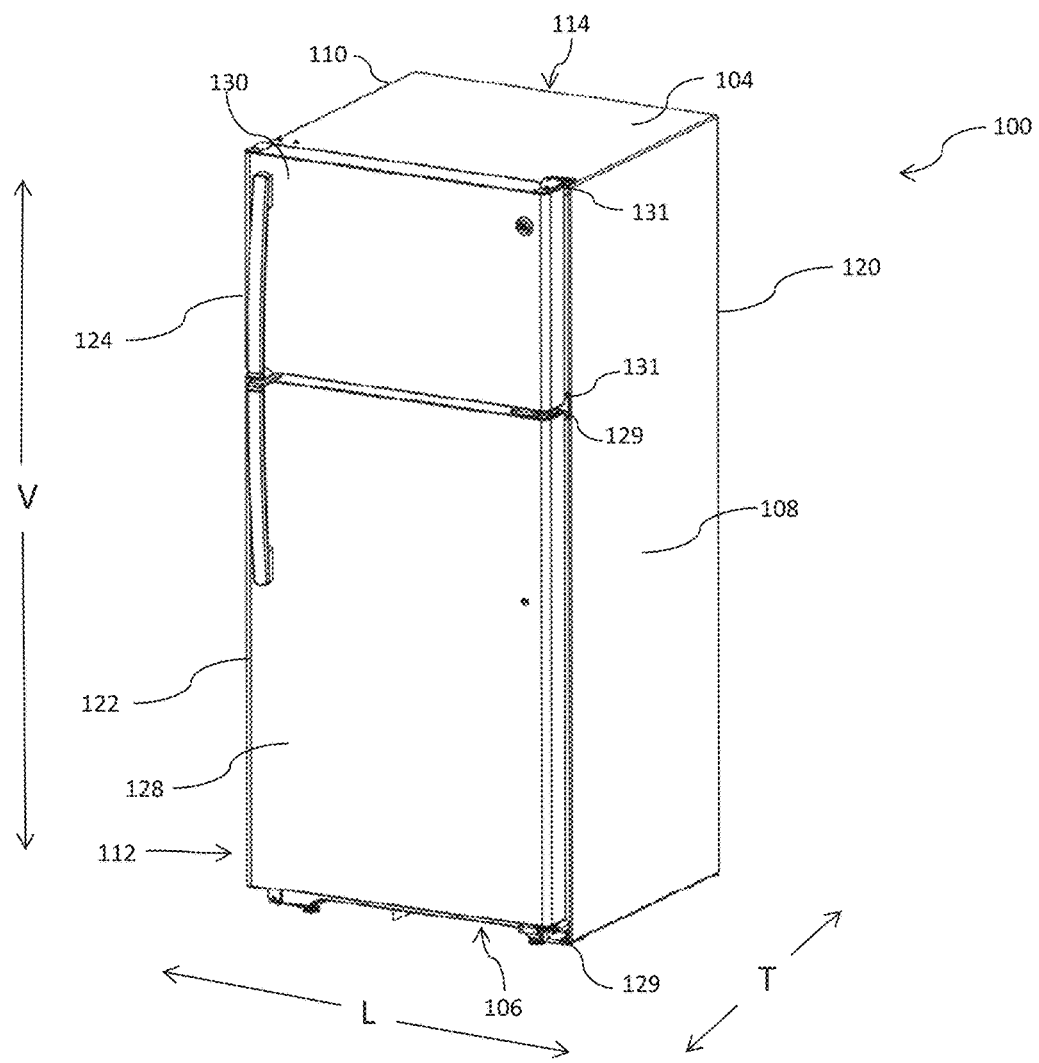
FIG. 1 depicts a front, perspective view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

By eliminating user interfaces, such as cold controls that are often included with refrigerators and replacing these components with a simplified control system, such as those including thermistors or those without a user interface that can be manipulated by an end user, energy efficiency of the refrigerator can be improved and the costs associated with the manufacture of the refrigerator can be reduced. Additionally, placing a more simplified control system, including thermistors, in a self-contained structure or otherwise located outside of the refrigerated compartment can allow for the reclamation of volume or increase in volume of the refrigerated compartment of the refrigerator. Thermistors can allow for more precise temperature measurements and control, and can also allow for more energy efficient operation of a refrigerator.

FIG. 1 is a perspective view of a refrigerator 100. It is recognized, however, that the benefits of the present invention apply to other types of refrigerators. Consequently, the description set forth herein is for illustrative purposes only and is not intended to limit the invention in any aspect.

Refrigerator 100 includes a cabinet or housing 120 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another and form an orthogonal direction system.

Housing 120 of refrigerator 100 defines a lower refrigerator compartment 122, also referred to as a fresh food compartment, arranged at or adjacent to bottom 106 and an upper freezer compartment 124 arranged at or adjacent to top 104 of refrigerator 100. As such, refrigerator 100 is generally referred to as a top freezer refrigerator or a top mount refrigerator. In the exemplary embodiment, housing 120 also defines a machinery compartment 362. Machinery compartment 362 can receive a sealed refrigeration system 360 (shown in FIG. 3). Refrigerator door 128 is rotatably hinged 129 to an edge of housing 120 for accessing refrigerator compartment 122. A freezer door 130 is rotatably hinged 131 for accessing freezer compartment 124.

Figure 2:
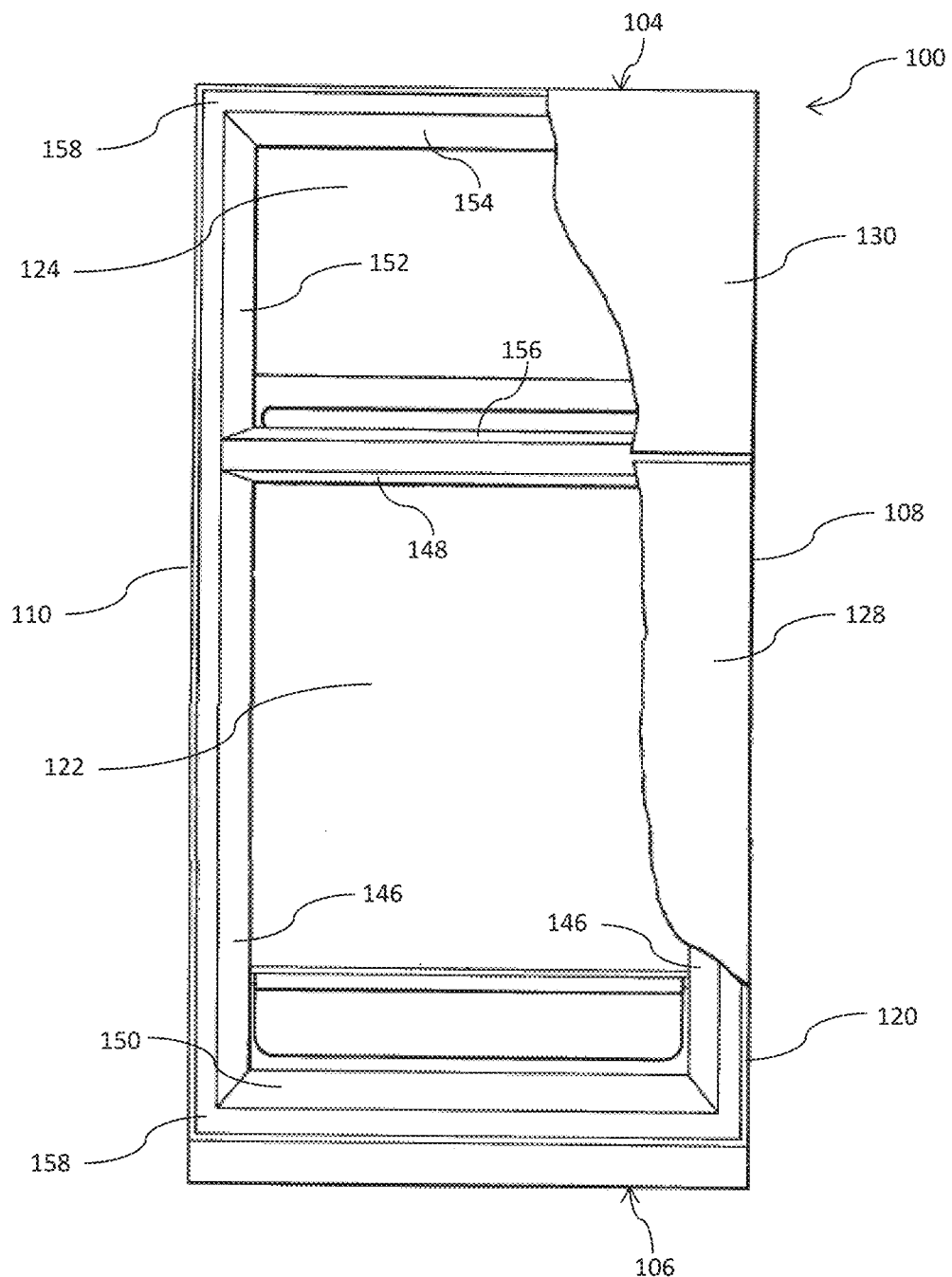
FIG. 2 depicts a front, cutaway view of the refrigerator appliance of FIG. 1 according to an exemplary embodiment of the present subject matter.

FIG. 2 is a front view of refrigerator 100 having a refrigerator door 128, partly cutaway, and having a freezer door 130, partly cutaway. As such, the various components of the interior of the refrigerator 100 are illustrated. Refrigerator 100 includes a refrigerator compartment 122 and freezer compartment 124. The refrigerator compartment 122 is defined by sidewalls 146, a ceiling 148 and bottom 150. The freezer compartment 124 is defined by sidewalls 152, a ceiling 154 and bottom 156. The housing 120, the sidewalls 146, ceiling 148 and bottom 150 of the refrigerator compartment, and the sidewalls 152, ceiling 154 and bottom 156 of the freezer compartment 124 define an insulated cavity 158. The insulated cavity 158, allows the temperature within the refrigerator compartment 122 and the freezer compartment 124 to be maintained at levels different from the ambient temperature surrounding refrigerator 100.

Figure 3:
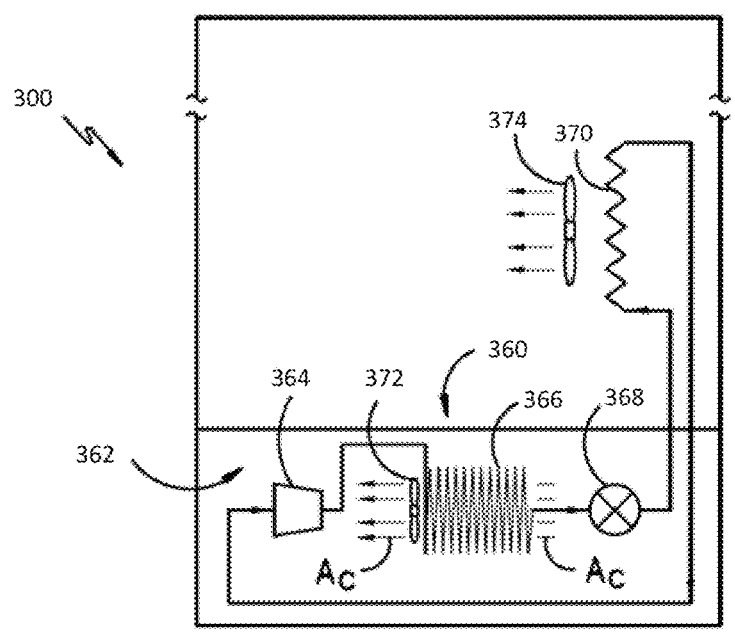
FIG. 3 is a schematic view of certain components of the exemplary refrigerator appliance of FIGS. 1 and 2.

FIG. 3 is a schematic view of certain components of a cooling system 300 of refrigerator 100, including a sealed refrigeration system 360 of refrigerator appliance 100. A machinery compartment 362 contains components for executing a known vapor compression cycle for cooling air. The components include a compressor 364, a condenser 366, an expansion device 368, and an evaporator 370 connected in series and charged with a refrigerant. As will be understood by those skilled in the art, refrigeration system 360 may include additional components, e.g., at least one additional evaporator, compressor, expansion device, and/or condenser. As an example, refrigeration system 360 may include two evaporators.

Within refrigeration system 360, refrigerant flows into compressor 364, which operates to increase the pressure of the refrigerant. This compression of the refrigerant raises its temperature, which is lowered by passing the refrigerant through condenser 366. Within condenser 366, heat exchange with ambient air takes place so as to cool the refrigerant. A condenser fan 372 is used to pull air across condenser 366, as illustrated by arrows $A_C$, so as to provide forced convection for a more rapid and efficient heat exchange between the refrigerant within condenser 366 and the ambient air. Thus, as will be understood by those skilled in the art, increasing air flow across condenser 366 can, e.g., increase the efficiency of condenser 366 by improving cooling of the refrigerant contained therein.

Expansion device 368 (e.g., a valve, capillary tube, or other restriction device) receives refrigerant from condenser 366. From expansion device 368, the refrigerant enters evaporator 370. Upon exiting expansion device 368 and entering evaporator 370, the refrigerant drops in pressure. Due to the pressure drop and/or phase change of the refrigerant, evaporator 370 is cool relative to compartments 122 and 124 of refrigerator appliance 100. As such, cooled air is produced and refrigerates compartments 122 and 124 of refrigerator appliance 100. Thus, evaporator 370 is a type of heat exchanger which transfers heat from air passing over evaporator 370 to refrigerant flowing through evaporator 370. An evaporator fan 374 is used to pull air across evaporator 370 and circulate air within compartments 122 and 124 of refrigerator appliance 100.

Collectively, the vapor compression cycle components in a refrigeration circuit, associated fans, and associated compartments are sometimes referred to as a sealed refrigeration system can operate to force cold air through compartments 122, 124 (FIG. 1 and FIG. 2). The refrigeration system 360 depicted in FIG. 3 is provided by way of example only. Thus, it is within the scope of the present subject matter for other configurations of the refrigeration system, such as magnetocaloric refrigeration, to be used as well.

Figure 4:
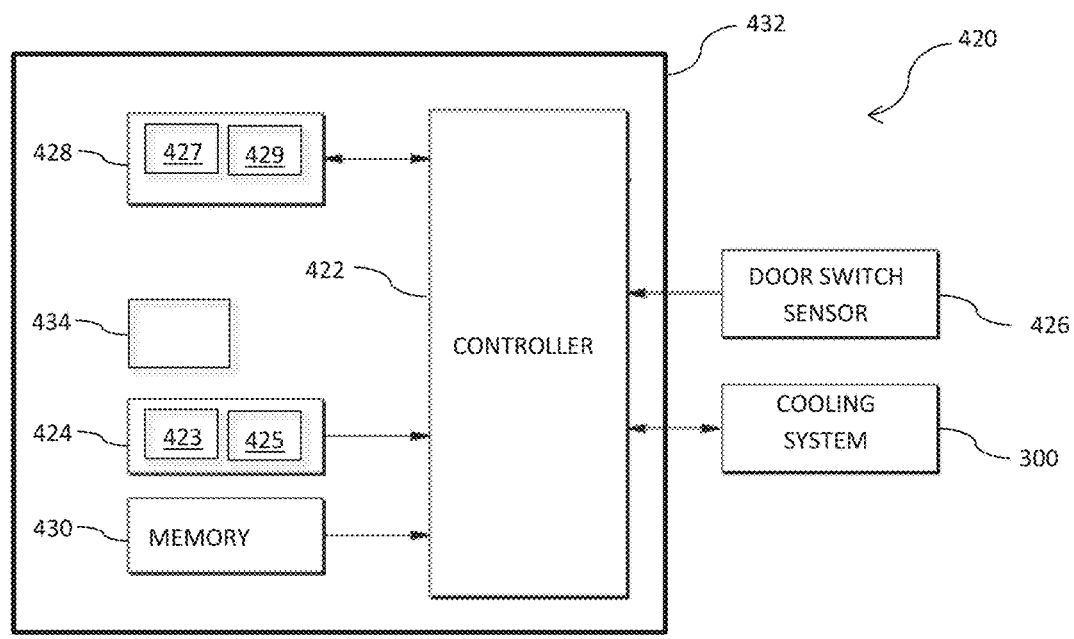
FIG. 4 is a schematic view of a control system of a refrigerator appliance according to an exemplary embodiment of the present subject matter.

FIG. 4 is a schematic view of a control system 420 applicable to refrigerator 100. Control system 420 includes a controller 422, such as a processor or microprocessor, for controlling the operation of refrigerator 100 by directing energy to the various electrical components of refrigerator 100. Control system 420 can include one or more memory devices 430. The one or more memory device(s) 430 can include one or more computer-readable media, including, but not limited to, non-transitory computer-readable media, RAM, ROM, hard drives, flash drives, or other memory devices.

The one or more memory device(s) 430 can store information accessible by the controller 422, including computer-readable instructions that can be executed by one or more controllers or microprocessor(s). The instructions can be any set of instructions that when executed by the one or more controllers, such as controller 422, cause the one or more processor(s) to perform operations. The instructions can be software written in any suitable programming language or can be implemented in hardware. In some embodiments, the instructions can be executed by the one or more microprocessor(s) to cause the one or more microprocessor(s) to perform operations, such as the operations for controlling operation of refrigerator 100 and cooling system 300, as described with reference to FIGS. 1-3 and 5-8, and/or any other operations or functions.

Controller 422 can receive signals from inputs such as, for example, one or more door switch sensors 426 for determining when a door such as refrigerator door 128 is open or freezer door 130 is open, and one or more thermistors 424, such as a first thermistor 423 and a second thermistor 425, for determining the temperature in the refrigerator compartment 122 and freezer compartment 124. Controller 422 can also receive signals from other inputs associated with refrigerator 100 including ambient temperature, ambient humidity, or the like. Moreover, control system 420 is operatively coupled to the cooling system 300, whereby, certain functions are performed in response to signals received from these inputs.

In the exemplary embodiment, controller 422 operates cooling system 300 based on one or more characteristics of one or more electronic temperature sensing devices, such as the one or more thermistors 424. Specifically, controller 422 can receive data indicative of the one or more characteristics of the thermistors 424 and process the data to determine the temperature of the refrigerator compartment 122 and freezer compartment 124. The characteristics of the thermistors 424 that can be used to determine the temperature of the refrigerated compartment 122 and freezer compartment 124 include resistance. Some thermistors 424 exhibit a decrease in electrical resistance when subjected to an increase in temperature, often referred to as Negative Temperature Coefficient thermistors. Some thermistors 424 exhibit an increase in electrical resistance when subjected to an increase in temperature, often referred to as Positive Temperature Coefficient thermistors.

Controller 422 can compare the temperature of the refrigerator compartment 122 and freezer compartment 124 to one or more predetermined thresholds 428, such as a first temperature threshold 427 and a second temperature threshold 429. For example, the predetermined thresholds 428 can be stored in memory 430 and can be a temperature or range of temperatures that are determined, by a party other than the end user of the refrigerator such as by the manufacturer, as the intended operating temperature, state or condition of the refrigerator compartment 122 and freezer compartment 124. For example a predetermined threshold associated with the refrigerator compartment 122 can be a temperature at or near thirty-seven degrees (37°) Fahrenheit. For example a predetermined threshold associated with the freezer compartment 124 can be a temperature at or near zero degrees (0°) Fahrenheit. Advantageously, controller 422 can initiate cooling system 300 which results in air flow and cooling of the refrigerator compartment 122 and freezer compartment 124. Controller 422 can receive a signal from thermistors 424 while cooling system 300 is operating. In accordance with the present disclosure, one or more thermistors 424 function as temperature sensors to determine the temperature of freezer compartment 124 and refrigerator compartment 122. Typically, controller 422 can regularly cycle between readings for freezer compartment 124 and refrigerator compartment 122.

Moreover, controller 422 can operate cooling system 300 based on inputs from the one or more door switch sensors 426. Specifically, when door switch sensor 426 determines that a door, such as refrigerator door 128, is in the open position, controller 422 changes the mode of operation of cooling system 300. For example, cooling system 300 ceases operation in response to refrigerator door 128 being in the open position. Alternatively, cooling system 300 operates in a power save mode when refrigerator door 128 is open.

In some embodiments, compressor 364 within the cooling system 300 can be a variable speed compressor. In some embodiments, control system 420 can include a circuit board 432. In some embodiments circuit board 432 can contain an inverter 434 configured to control the variable speed compressor. Data to control the function of the variable speed compressor can be imbedded in the inverter 434. Thus, in some embodiments, thermistor(s) 424 can be placed inside or located on the circuit board 432 containing the inverter 434 to improve the cost efficiency associated with the manufacture of the refrigerator and to decrease the size of the control system 420. In some embodiments the circuit board 432 can include single sided PCBs, double sided PCBs, multilayer PCBs, rigid PCBs, flex PCBs or rigid-flex PCBs.

Figure 5:
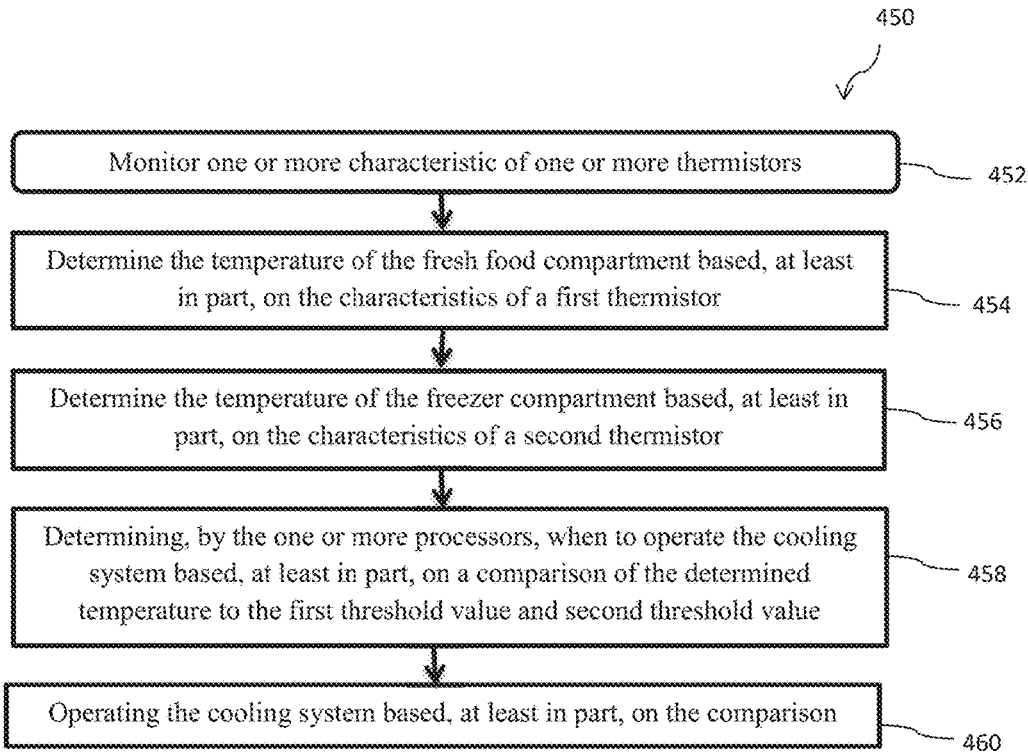
FIG. 5 depicts a flow diagram of an example method for controlling a refrigerator.

FIG. 5 depicts a flow diagram of an example method 450 according to example embodiments of the present disclosure. Method 450 can be performed by one or more controllers, such as controller 422, or by separate devices. FIG. 5 depicts steps performed in a particular order for purposes of illustration and discussion. Those of ordinary skill in the art, using the disclosure provided herein, will understand that the method discussed herein can be adapted, rearranged, expanded, omitted, performed simultaneously, or modified in various ways without deviating from the scope of the present disclosure.

At (452) the method can include monitoring one or more characteristics of one or more thermistors 424. One or more controllers, such as controller 422, can be used to monitor the characteristics of the one or more thermistors 424. The characteristics of the thermistors 424 that can be monitored can include resistance. Some thermistors 424 exhibit a decrease in electrical resistance when subjected to an increase in temperature, often referred to as Negative Temperature Coefficient thermistors. Some thermistors 424 exhibit an increase in electrical resistance when subjected to an increase in temperature, often referred to as Positive Temperature Coefficient thermistors.

At (454) the method can include determining the temperature of the fresh food compartment 122 based, at least in part, on the characteristics of a first thermistor 423. One or more controllers, such as controller 422, can be used to monitor the characteristics of the first thermistor 423. The characteristics of the first thermistor 423 that can be used to determine the temperature of the refrigerator compartment 122 can include resistance.

At (456) the method can include determining the temperature of the freezer compartment 124 based, at least in part, on the characteristics of a second thermistor 425. One or more controllers, such as controller 422, can be used to monitor the characteristics of the second thermistor 425. The characteristics of the second thermistor 425 that can be used to determine the temperature of the freezer compartment 124 can include resistance.

At (458) the method can include determining, by the one or more processors, such as controller 422, when to operate one or more components of the cooling system 300, such as the compressor 364, based, at least in part, on a comparison of the temperatures determined at 454 and 456 to the first threshold value 427 and second threshold value 429.

At (460) the method can include operating one or more components of the cooling system 300, such as the compressor 364, based, at least in part on the comparison at 458. At (460) the method can include operating one or more components of the cooling system 300, such as the compressor 364, when the temperature of the fresh food compartment 122, determined at 454, is greater than the first threshold value 427. At (460) the method can include operating one or more components of the cooling system 300, such as the compressor 364, when the temperature of the freezer compartment 124, determined at 456, is greater than the second threshold value 429.

Figure 6:
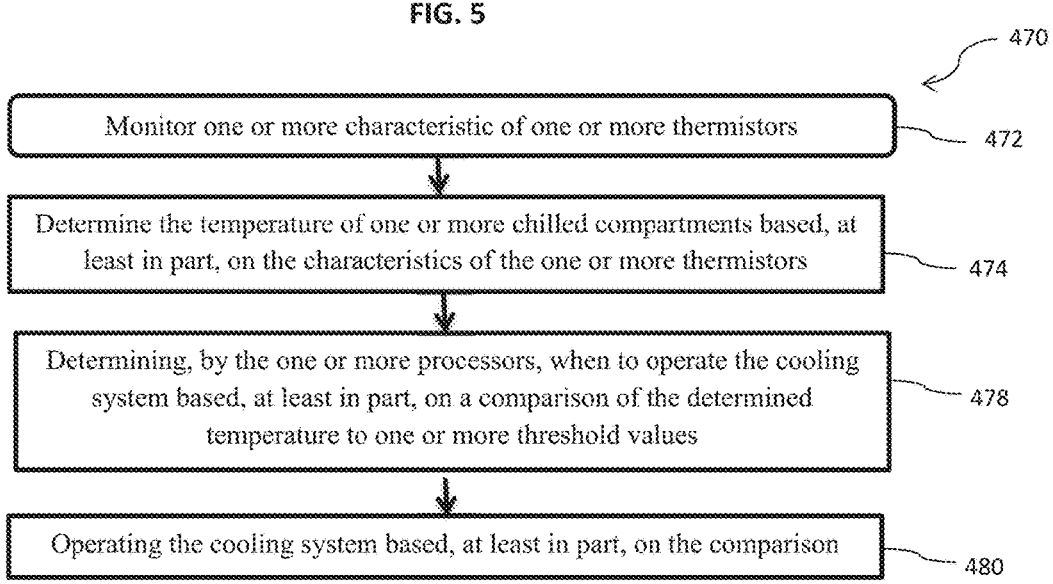
FIG. 6 depicts a flow diagram of an example method for controlling a refrigerator.

FIG. 6 depicts a flow diagram of an example method 470 according to example embodiments of the present disclosure. Method 470 can be performed by one or more controllers, such as controller 422, or by separate devices. FIG. 6 depicts steps performed in a particular order for purposes of illustration and discussion. Those of ordinary skill in the art, using the disclosure provided herein, will understand that the method discussed herein can be adapted, rearranged, expanded, omitted, performed simultaneously, or modified in various ways without deviating from the scope of the present disclosure.

At (472) the method can include monitoring one or more characteristics of one or more thermistors 424. One or more controllers, such as controller 422, can be used to monitor the characteristics of the one or more thermistors 424. The characteristics of the thermistors 424 that can be monitored can include resistance. Some thermistors 424 exhibit a decrease in electrical resistance when subjected to an increase in temperature, often referred to as Negative Temperature Coefficient thermistors. Some thermistors 424 exhibit an increase in electrical resistance when subjected to an increase in temperature, often referred to as Positive Temperature Coefficient thermistors.

At (474) the method can include determining the temperature of one or more chilled food compartments, such as the fresh food compartment 122 and the freezer compartment 124, based, at least in part, on the characteristics of a first thermistor 423. One or more controllers, such as controller 422, can be used to monitor the characteristics of the first thermistor 423. The characteristics of the first thermistor 423 that can be used to determine the temperature of the one or more chilled food compartments, such as the fresh food compartment 122 and the freezer compartment 124, can include resistance.

In some embodiments, one thermistor may be utilized in determining the temperature of the one or more chilled food compartments, such as the fresh food compartment 122 and the freezer compartment 124. In such an embodiment, a damper can be provided which controls the amount of chilled air that can flow between the one or more chilled food compartments. For instance, the damper can control the amount of chilled air that can flow from the freezer compartment 124 to the fresh food compartment 122.

At (478) the method can include determining, by the one or more processors, when to operate one or more components of the cooling system 300, such as the compressor 364, based, at least in part, on a comparison of the temperatures determined at 474 to one or more threshold values 428.

At (480) the method can include operating one or more components of the cooling system 300, such as the compressor 364, based, at least in part on the comparison at 478. At (480) the method can include operating the cooling system 300 when the temperature of the fresh food compartment 122, determined at 474, is greater than the first threshold value 427. At (480) the method can include operating the cooling system 300 when the temperature of the freezer compartment 124, determined at 474, is greater than the second threshold value 429.

Figure 7:
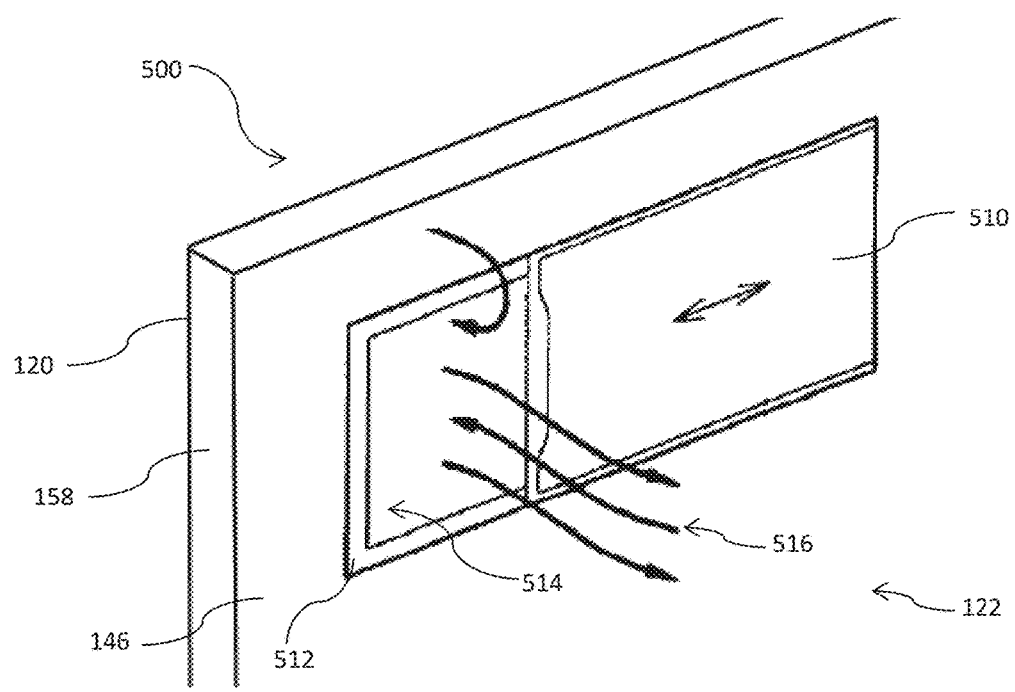
FIG. 7 depicts a close up, perspective view of a damper according to an exemplary embodiment of the present subject matter.

FIG. 7 is a perspective view of an exemplary embodiment of a damper assembly 500 located in the sidewall 146 of the refrigerator compartment 122. A door 510 that is movably attached to a frame 512. Door 510 is partially obstructing a passageway 514, which is shown in more detail in FIG. 7. Passageway 514 extends from the refrigerator compartment 122 to a thermistor mounting plate 620 (shown in FIG. 8) located in the insulated cavity 158. Door 510 and passageway 514 are configured such that refrigerated air 516 from the refrigerator compartment 122 can enter the passageway 514 and be received by, interact with or be measured by the one or more thermistors 424 (shown in FIG. 8).

Figure 8:
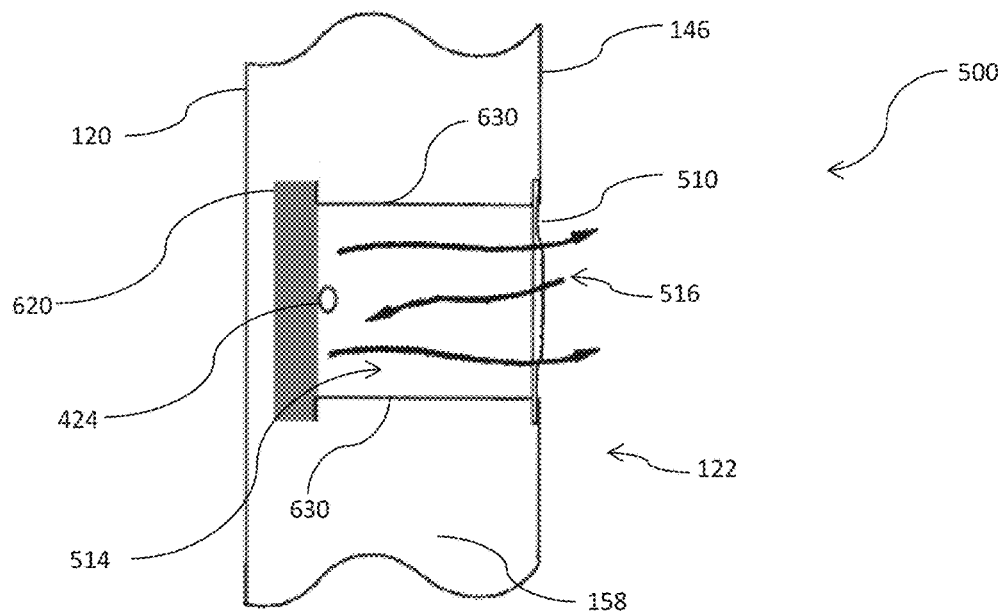
FIG. 8 depicts a profile view of the damper of FIG. 7 according to an exemplary embodiment of the present subject matter.

FIG. 8 is a profile view of a damper assembly 500 located in the sidewall 146 of the refrigerator compartment 122. While the damper assembly 500 is shown in the in sidewall 146 of the refrigerator compartment 122, one or more damper assemblies may be located throughout the freezer compartment 124 and refrigerator compartment 122, including the ceiling 148 and bottom 150 of the refrigerator compartment 122 and the sidewalls 152, ceiling 154 and bottom 156 of the freezer compartment 124 (shown in FIG. 2). Passageway walls 630 and a thermistor mounting plate 620 define the passageway 514. Passageway 514 extends from one or more of the refrigerated chambers, such as the refrigerator compartment 122, to the thermistor mounting plate 620 located in the insulated cavity 158. Door 510 and passageway 514 are configured such that refrigerated air 516 from the one or more refrigerated compartments, such as the refrigerator compartment 122, can enter the passageway and be received by, interact with or be measured by the thermistor(s) 424.

In some embodiments, thermistor 610 may be mounted within the refrigerator compartment 122 or the freezer compartment 124. In some embodiments, thermistor(s) 424 can be located inside of or on a circuit board 432 associated with the control system 420 or associated with the inverter 434 for a variable speed compressor. In some embodiments, the mounting plate 620 can be the circuit board 432 associated with the control system 420 (shown in FIG. 4).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator comprising:
   a refrigerator cabinet;
   one or more food compartments disposed within the cabinet;
   a cooling system;
   one or more temperature sensors, wherein at least one temperature sensor of the one or more temperature sensors comprises a first thermistor, electrically connected to a control system and configured to obtain a temperature of at least one food compartment of the one or more food compartments;
   a damper assembly disposed in a sidewall of the refrigerator cabinet, the damper assembly defining a passageway between the at least one food compartment and the first thermistor, the damper assembly having an opening in communication with the passageway and a sliding door disposed over the opening and configured to restrict airflow through the opening to the first thermistor from the at least one food compartment; and
   the control system adapted to monitor and control the temperature in the at least one food compartment, wherein the control system is configured to store instructions that when executed by one or more controllers cause the one or more controllers to perform operations, the operations comprising:
   determining the temperature of the at least one food compartment based, at least in part, on one or more characteristics of the first thermistor receiving air through the opening of the damper assembly;
   determining, by the one or more controllers, when to operate the cooling system based, at least in part, on a comparison of the determined temperature to a first threshold value, the comparison comprises:
   operating the cooling system when the determined temperature is greater than the first threshold value.

2. The refrigerator of claim 1, wherein the at least one food compartment is a fresh food compartment, and wherein the first thermistor is associated with the fresh food compartment.

3. The refrigerator of claim 2, the one or more food compartments further comprising a freezer compartment, wherein a second temperature sensor of the one or more temperature sensors is a second thermistor associated with the freezer compartment.

4. The refrigerator of claim 3, wherein the control system comprises a printed circuit board.

5. The refrigerator of claim 4, wherein at least one of the first thermistor and second thermistor is located on the printed circuit board.

6. The refrigerator of claim 5, wherein the printed circuit board is disposed outside of at least one of the fresh food compartment and the freezer compartment.

7. The refrigerator of claim 6, wherein the printed circuit board comprises an inverter for operating a variable speed compressor.

8. The refrigerator of claim 7, wherein the sliding door is situated between the fresh food compartment and the first thermistor.

9. The refrigerator of claim 8, the damper assembly further comprising a second sliding door that is situated between the freezer compartment and the second thermistor.

10. The refrigerator of claim 9, wherein the sliding door is moveably received in a sidewall of the fresh food compartment.

11. The refrigerator of claim 10, wherein the second sliding door is moveably received in a sidewall of the freezer compartment.

12. A control system for adjusting the temperature of a refrigerator, the refrigerator comprising one or more food compartments and a cooling system, the control system comprising a printed circuit board, one or more thermistors, one or more processors and one or more memory devices, the one or more memory devices configured to store instructions that when executed by the one or more processors cause the one or more processors to perform operations, the operations comprising:
   monitoring one or more characteristics of the one or more thermistors, wherein the one or more thermistors are disposed in the refrigerator, and wherein the refrigerator comprises a refrigerator cabinet and a damper assembly disposed in a sidewall of the refrigerator cabinet, the damper assembly defining a passageway between at least one food compartment and the one or more thermistors, the damper assembly having an opening in communication with the passageway and a sliding door disposed over the opening and configured to restrict airflow through the opening to the one or more thermistors from the at least one food compartment;
   determining the temperature of the at least one food compartment based, at least in part, on the characteristics of a first thermistor of the one or more thermistors;
   comparing the determined temperature of the at least one food compartment to a first threshold value; and
   determining, by the one or more processors, when to operate the cooling system based, at least in part, on a comparison of the determined temperature to a first threshold value, the comparison comprises:
   operating the cooling system when the determined temperature is greater than the first threshold value.

13. The control system of claim 12, wherein the refrigerator further comprises a fresh food compartment and a freezer compartment, the operations further comprise:
   determining the temperature of the freezer compartment based, at least in part, on the characteristics of a second thermistor of the one or more thermistors;
   comparing the determined temperature of the freezer compartment to a second threshold value; and
   determining, by the one or more processors, when to operate the cooling system based, at least in part, on a comparison of the determined temperature of the freezer compartment to a second threshold value, the comparison comprises:

operating the cooling system when the determined temperature of the freezer compartment is greater than the second threshold value.

14. The control system of claim 13 wherein at least one of the first thermistor and second thermistor is located on the printed circuit board.

15. The control system of claim 14 wherein the printed circuit board is disposed outside of at least one of the fresh food compartment and the freezer compartment.

16. A method for controlling the temperature of a refrigerator, the refrigerator comprising a refrigerator cabinet comprising a fresh food compartment, a freezer compartment and a cooling system, the control system comprising a printed circuit board, one or more thermistors, one or more processors and one or more memory devices, the one or more memory devices storing instructions that when executed by the one or more processors cause the one or more processors to perform operations, the method comprising:

monitoring one or more characteristics of the one or more thermistors, wherein the one or more thermistors are disposed in the refrigerator, and wherein the refrigerator further comprises a damper assembly disposed in a sidewall of the refrigerator cabinet, the damper assembly defining a passageway between the fresh food compartment and the one or more thermistors, the damper assembly having an opening in communication with the passageway and a sliding door disposed over the opening and configured to restrict airflow through the opening to the one or more thermistors from the fresh food compartment;

determining the temperature of the fresh food compartment based, at least in part, on the characteristics of a first thermistor of the one or more thermistors;

determining the temperature of the freezer compartment based, at least in part, on the characteristics of a second thermistor of the one or more thermistors; and determining, by the one or more processors, when to operate the cooling system based, at least in part, on a comparison of both of the determined temperatures to a first threshold value and a second threshold value, the comparison comprises:

operating the cooling system when the determined temperature of the fresh food compartment is greater than the first threshold value; and operating the cooling system when the determined temperature of the freezer compartment is greater than the second threshold value.

17. The method of claim 16, wherein the method further comprises: adjusting the sliding door, wherein the sliding door is moveably situated between the fresh food compartment and the first thermistor.

18. The method of claim 17, wherein the damper assembly further comprises a second sliding door and the method further comprises: adjusting the second sliding door, wherein the second sliding door is moveably situated between the freezer compartment and the second thermistor.

19. The method of claim 18, wherein the printed circuit board is disposed outside of at least one of the fresh food compartment and the freezer compartment.

20. The method of claim 19, wherein at least one of the first thermistor and second thermistor is located on the printed circuit board.

* * * * *